US012560131B2

(12) United States Patent
Ando et al.

(10) Patent No.: US 12,560,131 B2
(45) Date of Patent: Feb. 24, 2026

(54) FAN CASE ASSEMBLY OF TURBO FAN ENGINE

(71) Applicant: KAWASAKI JUKOGYO KABUSHIKI KAISHA, Kobe (JP)

(72) Inventors: Takahiro Ando, Kobe (JP); Hirokazu Sasaki, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 0 days.

(21) Appl. No.: 18/283,965

(22) PCT Filed: Mar. 31, 2021

(86) PCT No.: PCT/JP2021/014003
§ 371 (c)(1),
(2) Date: Sep. 25, 2023

(87) PCT Pub. No.: WO2022/208801
PCT Pub. Date: Oct. 6, 2022

(65) Prior Publication Data
US 2024/0167434 A1      May 23, 2024

(51) Int. Cl.
| | |
|---|---|
| *F02K 1/82* | (2006.01) |
| *F02C 7/24* | (2006.01) |
| *F02K 1/44* | (2006.01) |

(52) U.S. Cl.
CPC .................. *F02K 1/44* (2013.01); *F02C 7/24* (2013.01); *F02K 1/827* (2013.01)

(58) Field of Classification Search
CPC ... F02C 7/24; F02K 1/44; F02K 1/827; F02K 3/06; F05D 2220/36; F05D 2300/50212; F04D 29/664; F04D 29/4226
See application file for complete search history.

(56) References Cited

U.S. PATENT DOCUMENTS

| | | | | |
|---|---|---|---|---|
| 3,507,355 A | * | 4/1970 | Lawson | F02K 1/827 |
| | | | | 181/292 |
| 4,149,824 A | * | 4/1979 | Adamson | F01D 21/006 |
| | | | | 415/197 |
| 5,267,828 A | * | 12/1993 | Lenhart | F16B 5/0208 |
| | | | | 415/196 |

(Continued)

FOREIGN PATENT DOCUMENTS

| | | |
|---|---|---|
| EP | 2 305 985 A2 | 4/2011 |
| EP | 2 600 008 A1 | 6/2013 |

(Continued)

OTHER PUBLICATIONS

International Search Report for PCT/JP2021/014003 dated May 18, 2021 [PCT/ISA/210].

*Primary Examiner* — Devon C Kramer
*Assistant Examiner* — Henry Ng
(74) *Attorney, Agent, or Firm* — Sughrue Mion, PLLC

(57) ABSTRACT
A fan case assembly of a turbo fan engine including a tubular fan case surrounding a fan of the turbo fan engine from an outside in a radial direction. The assembly also includes a tubular panel set covering an inner peripheral surface of the fan case and including panels lined up in an axial direction of the turbo fan engine and at least one elastic body compressed by two members selected from the fan case and the panels.

6 Claims, 11 Drawing Sheets

(56) References Cited

U.S. PATENT DOCUMENTS

| | | | | |
|---|---|---|---|---|
| 5,443,366 | A * | 8/1995 | Knott | F01D 5/323 |
| | | | | 416/221 |
| 5,987,879 | A * | 11/1999 | Ono | F01D 9/023 |
| | | | | 60/800 |
| 7,448,849 | B1 * | 11/2008 | Webster | F01D 11/22 |
| | | | | 415/128 |
| 7,735,601 | B1 * | 6/2010 | Stieger | F02K 1/827 |
| | | | | 181/219 |
| 9,255,489 | B2 * | 2/2016 | DiTomasso | F01D 11/122 |
| 2005/0106010 | A1 * | 5/2005 | Evans | F01D 17/162 |
| | | | | 415/160 |
| 2011/0076132 | A1 * | 3/2011 | Bottome | F01D 25/26 |
| | | | | 415/9 |
| 2012/0224958 | A1 * | 9/2012 | Reed | F01D 25/243 |
| | | | | 415/213.1 |
| 2013/0136577 | A1 * | 5/2013 | Evans | F04D 29/526 |
| | | | | 415/121.2 |
| 2015/0003960 | A1 | 1/2015 | Totten et al. | |
| 2015/0367953 | A1 * | 12/2015 | Yu | B64D 33/06 |
| | | | | 181/290 |
| 2015/0369127 | A1 * | 12/2015 | Gilson | F01D 25/24 |
| | | | | 415/119 |
| 2016/0032834 | A1 | 2/2016 | Plante et al. | |
| 2018/0245516 | A1 * | 8/2018 | Howarth | B32B 27/06 |
| 2018/0246615 | A1 * | 8/2018 | Nakamura | G06F 3/0443 |
| 2018/0258956 | A1 * | 9/2018 | Marchaj | F04D 29/664 |
| 2019/0063460 | A1 * | 2/2019 | Costa | F02K 3/06 |
| 2022/0106049 | A1 * | 4/2022 | Glemarec | F02C 7/045 |
| 2022/0220925 | A1 * | 7/2022 | Jodet | F02K 1/72 |

FOREIGN PATENT DOCUMENTS

| | | |
|---|---|---|
| EP | 3 001 040 A1 | 3/2016 |
| EP | 3 002 420 A1 | 4/2016 |
| GB | 2 407 344 A | 4/2005 |
| JP | 2016-513773 A | 5/2016 |

* cited by examiner

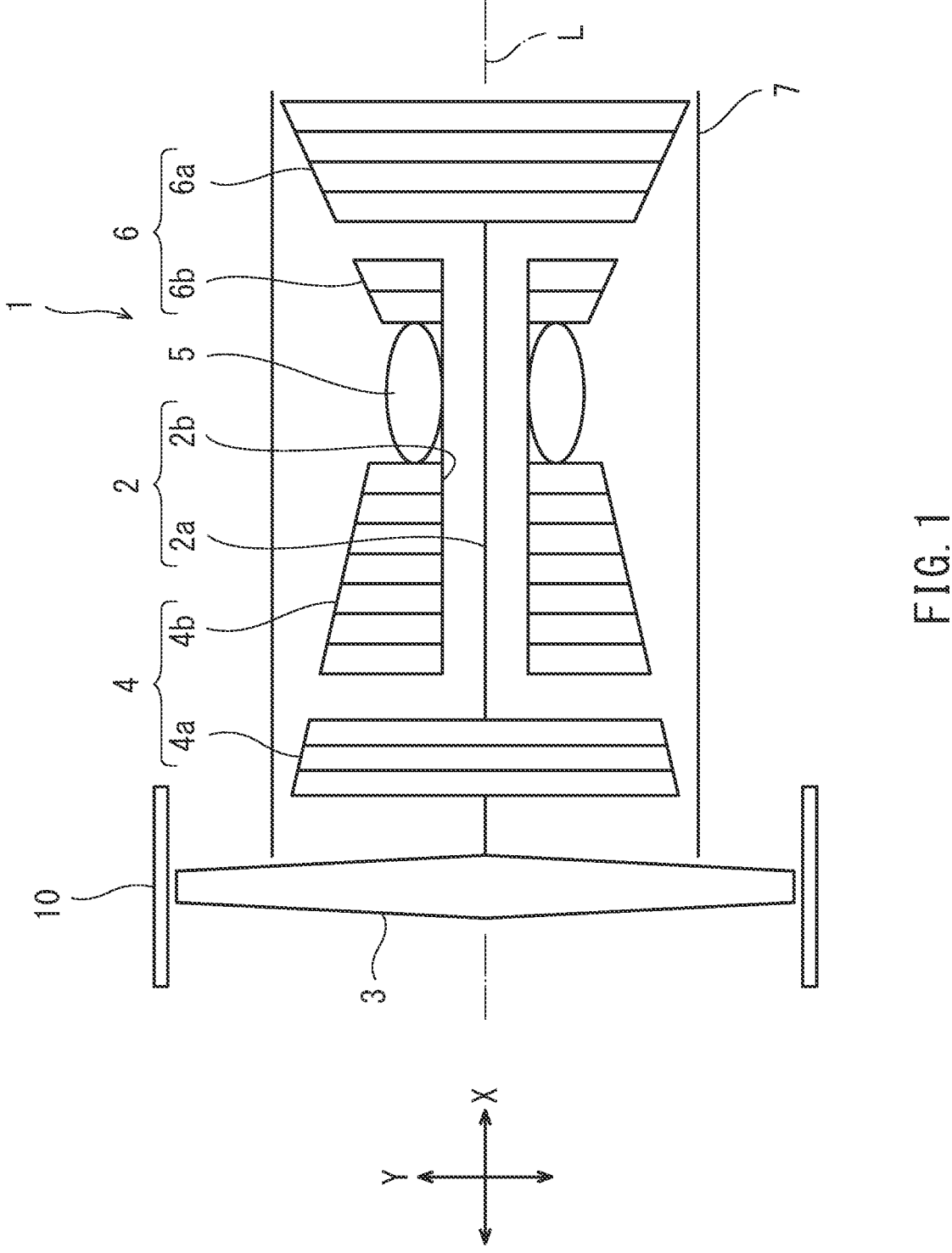
F I G. 1

FAN CASE ASSEMBLY OF TURBO FAN ENGINE

CROSS REFERENCE TO RELATED APPLICATIONS

This application is a National Stage of International Application No. PCT/JP2021/014003 filed Mar. 31, 2021.

TECHNICAL FIELD

The present disclosure relates to a fan case assembly of a turbo fan engine.

BACKGROUND ART

PTL 1 discloses a cylindrical fan case assembly surrounding a fan of a turbo fan engine of an aircraft from an outside in a radial direction. The fan case assembly includes: a fan case; a first panel that covers an inner peripheral surface of the fan case and is opposed to the fan; and a second panel that covers the inner peripheral surface of the fan case and is located upstream or downstream of the first panel. Each of the fan case, the first panel, and the second panel is fixed with an adhesive or a bolt.

CITATION LIST

Patent Literature

PTL 1: Published Japanese Translation of PCT Application No. 2016-513773

SUMMARY OF INVENTION

Technical Problem

However, when there is a thermal expansion difference or a machining tolerance among the fan case, the first panel, and the second panel, stress concentrates at a coupled portion realized by the adhesive or the bolt. Moreover, when the size of a gap between members increases due to the thermal expansion difference or the machining tolerance among the fan case, the first panel, and the second panel, vibration tends to occur during the operation of the engine.

Solution to Problem

A fan case assembly of a turbo fan engine according to one aspect of the present disclosure includes: a tubular fan case surrounding a fan of the turbo fan engine; a tubular panel set covering an inner peripheral surface of the fan case and including panels lined up in an axial direction of the turbo fan engine; and at least one elastic body compressed by two members selected from the fan case and the panels.

According to the above configuration, the positions of two members selected from the fan case and the panels are stably held by the elastic body, and the thermal expansion difference and the machining tolerance are absorbed by the elastic deformation of the elastic body between the two members. Therefore, stress concentration and vibration of the fan case assembly can be reduced.

Advantageous Effects of Invention

According to one aspect of the present disclosure, stress concentration and vibration of the fan case assembly can be reduced.

BRIEF DESCRIPTION OF DRAWINGS

FIG. 1 is a sectional view of a turbo fan engine according to an embodiment which is viewed from a radial direction.

DESCRIPTION OF EMBODIMENTS

Figure 2:
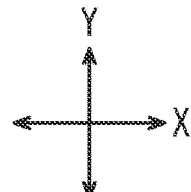
FIG. 2 is a sectional view of a fan case assembly of FIG. 1 which is viewed from the radial direction.

Hereinafter, an embodiment will be described with reference to the drawings. In the following description, an axial direction X denotes a direction in which a rotation axis L of a rotating shaft 2 of a turbo fan engine 1 extends. A radial direction Y denotes a direction orthogonal to the rotation axis X. A circumferential direction Z denotes a direction circumferentially extending around the rotation axis X. Moreover, "front" denotes an upstream side in a direction in which air flows in the turbo fan engine 1, and "rear" denotes a downstream side in the direction in which the air flows in the turbo fan engine 1.

FIG. 1 is a sectional view of the turbo fan engine 1 according to the embodiment which is viewed from the radial direction. As shown in FIG. 1, the turbo fan engine 1 is, for example, a gas turbine engine used in an aircraft. The use of the gas turbine is not limited to the aircraft. The turbo fan engine 1 includes the rotating shaft 2, a fan 3, a compressor 4, a combustor 5, a turbine 6, a casing 7, and a fan case assembly 10. The rotating shaft 2 extends in a front-rear direction of the turbo fan engine 1. The fan 3 is connected to a front portion of the rotating shaft 2 and rotates together with the rotating shaft 2. The compressor 4, the combustor 5, and the turbine 6 are lined up along the rotating shaft 2 in this order from a front side to a rear side. The casing 7 accommodates the rotating shaft 2, the compressor 4, the combustor 5, and the turbine 6. The casing 7 and the fan case assembly 10 are tubular objects each including an axis that coincides with the rotation axis L of the rotating shaft 2.

The turbo fan engine 1 is, for example, a two-shaft gas turbine engine, but may be a three-shaft gas turbine engine or the like. The compressor 4 includes a low pressure compressor 4a and a high pressure compressor 4b located behind the low pressure compressor 4a. The turbine 6 includes a high pressure turbine 6b and a low pressure turbine 6a located behind the high pressure turbine 6b. The rotating shaft 2 includes a low pressure shaft 2a and a high pressure shaft 2b. The low pressure shaft 2a couples the low pressure compressor 4a to the low pressure turbine 6a, and the high pressure shaft 2b couples the high pressure compressor 4b to the high pressure turbine 6b. The high pressure shaft 2b is a tubular shaft including a hollow space therein. The low pressure shaft 2a is in the hollow space of the high pressure shaft 2b. The low pressure turbine 6a is coupled through the low pressure shaft 2a to the fan 3 located in front of the compressor 4.

The fan 3 is covered with the tubular fan case assembly 10 from an outside in the radial direction Y. The fan case assembly 10 is a tubular object including an axis that coincides with the rotation axis L. A cylindrical bypass passage is located between the casing 7 and the fan case assembly 10. Air sucked by the fan 3 flows through the bypass passage and is ejected rearward to generate propulsive force. The fan case assembly 10 is covered with an outer cover (not shown) from the outside in the radial direction Y.

Figure 3:
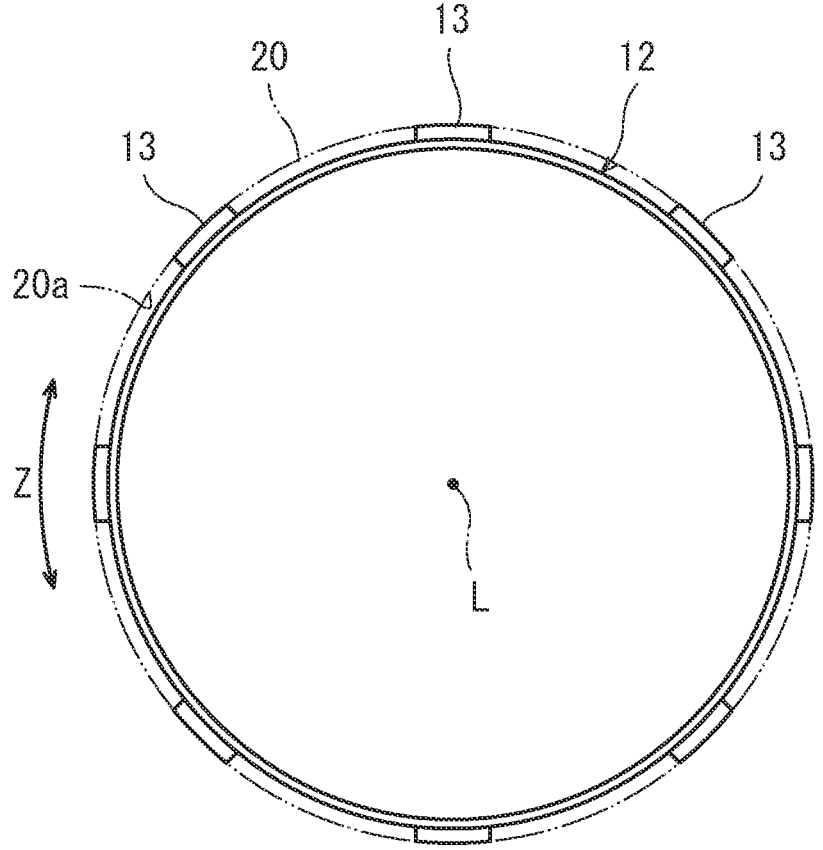
FIG. 3 is a front view of the fan case assembly of FIG. 2 which is viewed from an axial direction.

FIG. 2 is a sectional view of the fan case assembly 10 of FIG. 1 which is viewed from the radial direction. FIG. 3 is a front view of the fan case assembly 10 of FIG. 2 which is viewed from the axial direction X. As shown in FIG. 2, the fan case assembly 10 includes a fan case 11, a panel set 12, radial elastic bodies 13, a first axial elastic body 14, and a second axial elastic body 15. The fan case 11 has a tubular shape including the rotation axis L as a center axis. The fan case 11 surrounds the fan 3 from the outside in the radial direction Y. Specifically, the fan case 11 includes a fan case main body 20, a front closing plate 21, and a rear closing plate 22.

The fan case main body 20 has a tubular shape. Each of the front closing plate 21 and the rear closing plate 22 is an annular plate having a center located on the rotation axis L. The shapes of the front closing plate 21 and the rear closing plate 22 are not especially limited as long as the front closing plate 21 and the rear closing plate 22 can be fixed to the fan case main body 20. The front closing plate 21 is detachably fixed to a front end of the fan case main body 20 with a fastener. The rear closing plate 22 is detachably fixed to a rear end of the fan case main body 20 with a fastener. The front closing plate 21 and the rear closing plate 22 project inward in the radial direction Y beyond an inner peripheral surface 20a of the fan case main body 20. One of the front closing plate 21 and the rear closing plate 22 may be fixed to the fan case main body 20 in a non-detachable manner.

The panel set 12 has a tubular shape that covers the inner peripheral surface 20a of the fan case main body 20. The panel set 12 includes panels lined up from the front side to the rear side in the axial direction X. For example, the panel set 12 includes a fan track liner panel 30, a first sound absorbing panel 31, and a second sound absorbing panel 32. The fan track liner panel 30 is opposed to the fan 3 (see FIG. 1) from the outside in the radial direction Y. The first sound absorbing panel 31 is located at one side (front side) of the fan track liner panel 30 in the axial direction X. The second sound absorbing panel 32 is located at the other side (rear side) of the fan track liner panel 30 in the axial direction X.

The fan case 11 and the panel set 12 are made of different materials. A linear expansion coefficient of the fan case 11 and a linear expansion coefficient of the panel set 12 are different from each other. For example, the linear expansion coefficient of the fan case 11 is smaller than the linear expansion coefficient of the panel set 12. Specifically, the fan case 11 may be made of fiber-reinforced resin, metal, or the like, and the panel set 12 may be made of metal, resin, fiber-reinforced resin, or the like. As the fiber-reinforced resin, FRP including carbon fiber and epoxy resin is suitable, but another type of FRP may be used. As the metal, aluminum is suitably used, but another type of metal may be used. The fan case 11 and the panel set 12 may be made of the same material. The linear expansion coefficient of the fan case 11 and the linear expansion coefficient of the panel set 12 may be equal to each other.

The fan case 11 (fan case main body 20) and the panel set 12 are located with a radial gap Gr therebetween. The radial gap Gr is a space (air layer) between an inner peripheral surface of the fan case 11 and an outer peripheral surface of the panel set 12.

The fan track liner panel 30 and the first sound absorbing panel 31 are located with a first axial gap Ga1 therebetween. The fan track liner panel 30 and the second sound absorbing panel 32 are located with a second axial gap Ga2 therebetween. The first axial gap Ga1 and the second axial gap Ga2 are spaces (air layers).

Each of the fan track liner panel 30, the first sound absorbing panel 31, and the second sound absorbing panel 32 is, for example, a single object having a tubular shape. However, each of the fan track liner panel 30, the first sound absorbing panel 31, and the second sound absorbing panel 32 may be an object including parts that form a tubular shape (for example, an object including a pair of semi-tubular bodies that are engaged with each other to form a tubular shape) or may have a pseudo tubular shape including a C-shaped section. To be specific, each of the panels 30 to 32 may have a substantially tubular shape as a whole.

An inner peripheral surface of the fan track liner panel 30 is made of a material that is lower in wear resistance than a material of an inner peripheral surface of the first sound absorbing panel 31 and a material of an inner peripheral surface of the second sound absorbing panel 32. To be specific, when the fan 3 contacts the inner peripheral surface of the fan track liner panel 30, the fan track liner panel 30 is worn away, and therefore, the fan 3 is protected. Each of the inner peripheral surface of the first sound absorbing panel 31 and the inner peripheral surface of the second sound absorbing panel 32 includes sound absorbing holes. Each of the first sound absorbing panel 31 and the second sound absorbing panel 32 includes therein resonance chambers that communicate with the respective sound absorbing holes.

For example, each of the fan track liner panel 30, the first sound absorbing panel 31, and the second sound absorbing panel 32 may have such a structure that a honeycomb panel is sandwiched between an outer plate and an inner plate from both sides in the radial direction Y. In this case, for example, the inner panel of the fan track liner panel 30 is made of a material that is lower in wear resistance than a material of the inner panel of the first sound absorbing panel 31 and a material of the inner panel of the second sound absorbing panel 32. Each of the inner panel of the first sound absorbing panel 31 and the inner panel of the second sound absorbing panel 32 includes the sound absorbing holes.

The fan case 11 may be made of, for example, fiber-reinforced resin. The sound absorbing panels 31 and 32 may be made of, for example, aluminum. The honeycomb panel of the fan track liner panel 30 may be made of, for example, meta-aramid fibers including gaps filled with epoxy. This material composition is merely one example, and the present embodiment is not limited to this.

The radial elastic bodies 13 are located in the radial gap Gr. The radial elastic bodies 13 are located between the fan case 11 and the panel set 12. The radial elastic bodies 13 are compressed in the radial direction Y by the fan case 11 and the panel set 12. The radial elastic bodies 13 are elastically deformable in the radial direction Y. The radial elastic bodies 13 may be, for example, springs or may be members made of an elastic material, such as rubber. The radial elastic bodies 13 are located on the outer peripheral surface of the panel set 12 at regular intervals in the circumferential direction Z. The radial elastic bodies 13 may be located on the outer peripheral surface of the panel set 12 at arbitrary intervals in the circumferential direction Z.

As shown in FIG. 2, the first axial elastic body 14 is located in the first axial gap Ga1. The first axial elastic body 14 is located between the fan track liner panel 30 and the first sound absorbing panel 31. The first axial elastic body 14 is compressed in the axial direction X by the fan track liner panel 30 and the first sound absorbing panel 31. The second axial elastic body 15 is located in the second axial gap Ga2. The second axial elastic body 15 is located between the fan track liner panel 30 and the second sound absorbing panel 32. The second axial elastic body 15 is compressed in the axial direction X by the fan track liner panel 30 and the second sound absorbing panel 32. The first axial elastic body 14 and the second axial elastic body 15 are elastically deformable in the axial direction X. The first axial elastic body 14 and the second axial elastic body 15 may be, for example, springs or may be members made of an elastic material, such as rubber.

Figure 4A:
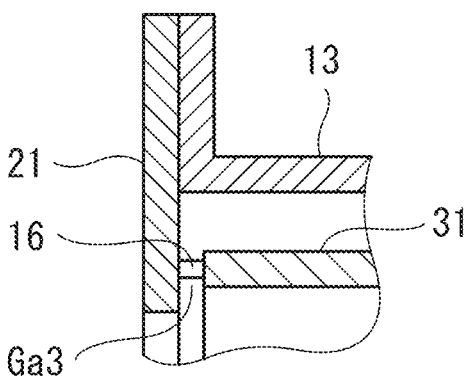
FIGS. 4A and 4B are enlarged sectional views showing a modified example of the fan case assembly of FIG. 2.
Figure 4B:
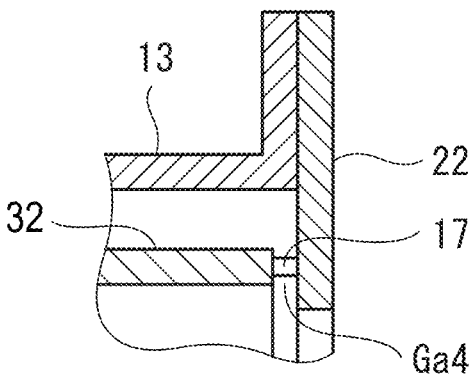

As shown in FIG. 4A, an axial elastic body 16 may be located in an axial gap Ga3 between the front closing plate 21 and the first sound absorbing panel 31. Moreover, as shown in FIG. 4B, an axial elastic body 17 may be located in an axial gap Ga4 between the rear closing plate 22 and the second sound absorbing panel 32. To be specific, the axial elastic body may be located in a compressed state between at least two adjacent elements selected from the front closing plate 21, the first sound absorbing panel 31, the fan track liner panel 30, the second sound absorbing panel 32, and the rear closing plate 22.

Figure 5:
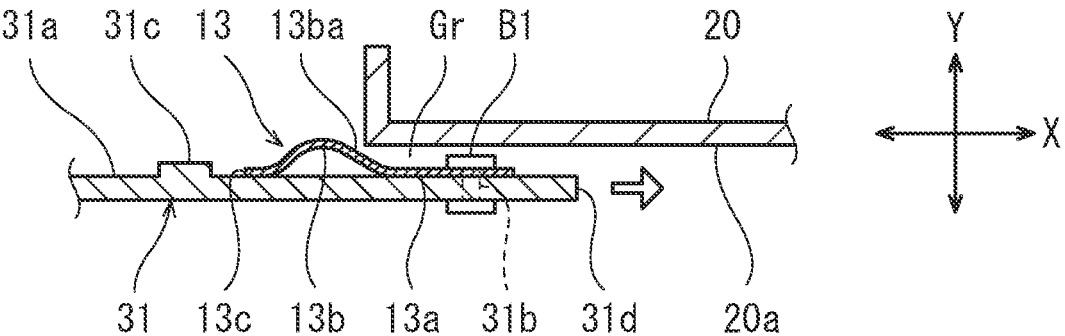
FIG. 5 is an enlarged view showing a radial elastic body of FIG. 2 and its vicinity.

FIG. 5 is an enlarged view showing the radial elastic body 13 of FIG. 2 and its vicinity. The same radial elastic bodies 13 can be used as the radial elastic bodies 13 attached to the first sound absorbing panel 31, the radial elastic bodies 13 attached to the fan track liner panel 30, and the radial elastic bodies 13 attached to the second sound absorbing panel 32. Therefore, in FIG. 5, the radial elastic body 13 attached to the first sound absorbing panel 31 will be especially described. In consideration of the thermal expansion difference, the machining tolerance, and the like among the first sound absorbing panel 31, the fan track liner panel 30, and the second sound absorbing panel 32, the radial elastic bodies 13 may be different in material, shape, and the like from each other.

As shown in FIG. 5, the radial elastic body 13 includes an attaching portion 13a and an elastic portion 13b that is continuous with the attaching portion 13a in the axial direction X. The attaching portion 13a is fastened to the first sound absorbing panel 31 with a fastener B1 in an attachment hole 31b of the first sound absorbing panel 31. The elastic portion 13b is elastically deformable in the radial direction Y. A projecting amount of the elastic portion 13b projecting outward in the radial direction Y from the first sound absorbing panel 31 is larger than that of the fastener B1. The attaching portion 13a may be fixed to the first sound absorbing panel 31 with another type of means, such as an adhesive. The radial elastic body 13 may be attached to the fan case main body 20 instead of being attached to the first sound absorbing panel 31.

The radial elastic body 13 is, for example, a plate spring extending in the axial direction X. The attaching portion 13a has a shape (for example, a circular-arc shape) corresponding to an outer peripheral surface 31a of the first sound absorbing panel 31. In an X-Y section (section shown in FIG. 5), the elastic portion 13b includes at least one portion that projects outward in the radial direction Y. In the present embodiment, the elastic portion 13b includes one portion that projects in an arch shape. However, the shape of the elastic portion 13b is not limited to this. One end portion which is opposite to the attaching portion 13a out of both end portions of the radial elastic body 13 in the axial direction X is an end portion 13c that is not fixed. The end portion 13c may be fixed to the first sound absorbing panel 31.

The elastic portion 13b has a tapered shape that tapers toward the fan case main body 20 of the fan case 11. The elastic portion 13b includes a slope surface 13ba that is continuous with the attaching portion 13a. The slope surface 13ba is an inclined surface that gradually approaches the outer peripheral surface 31a of the first sound absorbing panel 31 as it approaches the attaching portion 13a.

At the time of the assembling of the fan case assembly 10, when the first sound absorbing panel 31 is inserted from the front side into the fan case main body 20 from which the front closing plate 21 has been detached, the slope surface 13ba is pressed by the fan case main body 20, and the elastic portion 13b is compressed inward in the radial direction Y. At this time, the end portion 13c of the radial elastic body 13 slides on the outer peripheral surface 31a of the first sound absorbing panel 31 in the axial direction X.

The outer peripheral surface 31a of the first sound absorbing panel 31 includes a stopper 31c that is located away from the end portion 13c of the radial elastic body 13 by an arbitrary distance. The stopper 31c projects outward in the radial direction Y from the outer peripheral surface 31a of the first sound absorbing panel 31. When the elastic portion 13b is pressed by the fan case main body 20, the end portion 13c slides in the axial direction X so as to approach the stopper 31c, and then, the end portion 13c contacts the stopper 31c. Thus, the sliding of the end portion 13c is restricted. Therefore, the elastic deformation of the elastic portion 13b is limited, and the fan case main body 20 is prevented from contacting the fastener B1.

The elastic portion 13b of the radial elastic body 13 is pressed inward in the radial direction Y by the fan case main body 20, and therefore, the first sound absorbing panel 31 is elastically supported by the radial elastic body 13 in the radial direction Y relative to the fan case main body 20. The first sound absorbing panel 31 can approach or separate from the fan case main body 20 in the radial direction Y while being supported by the fan case main body 20.

Figure 6A:
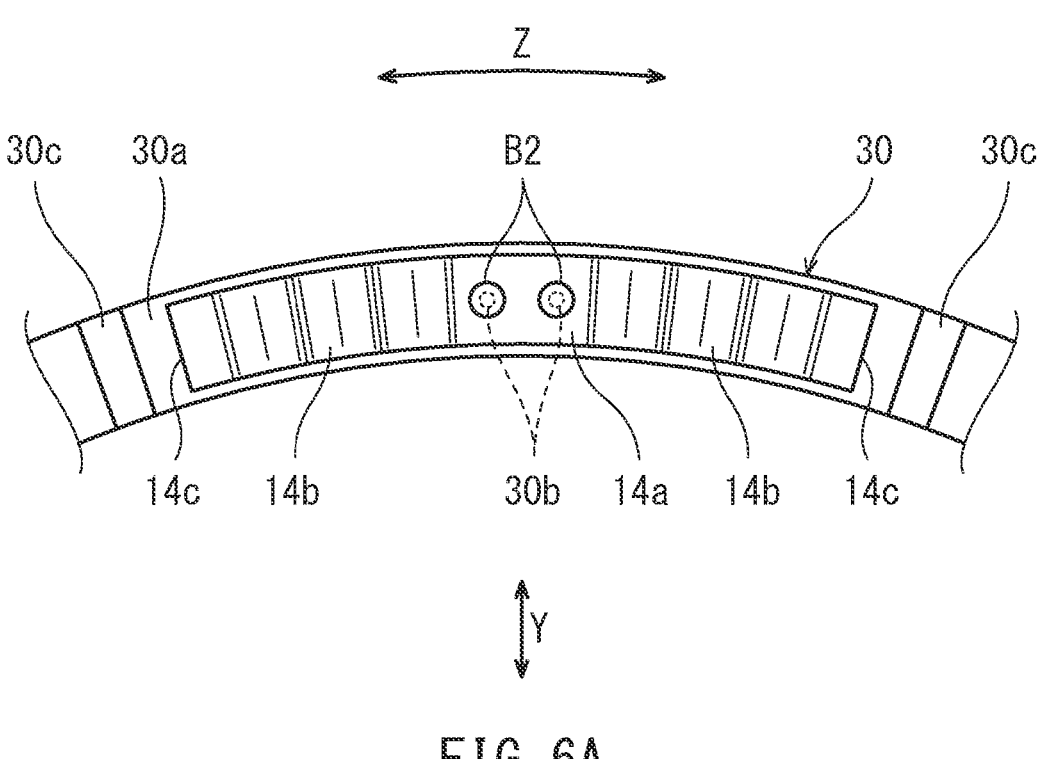
FIG. 6A is an enlarged view showing an axial elastic body and its vicinity in a sectional view taken along line VIa-VIa of FIG. 2.
Figure 6B:
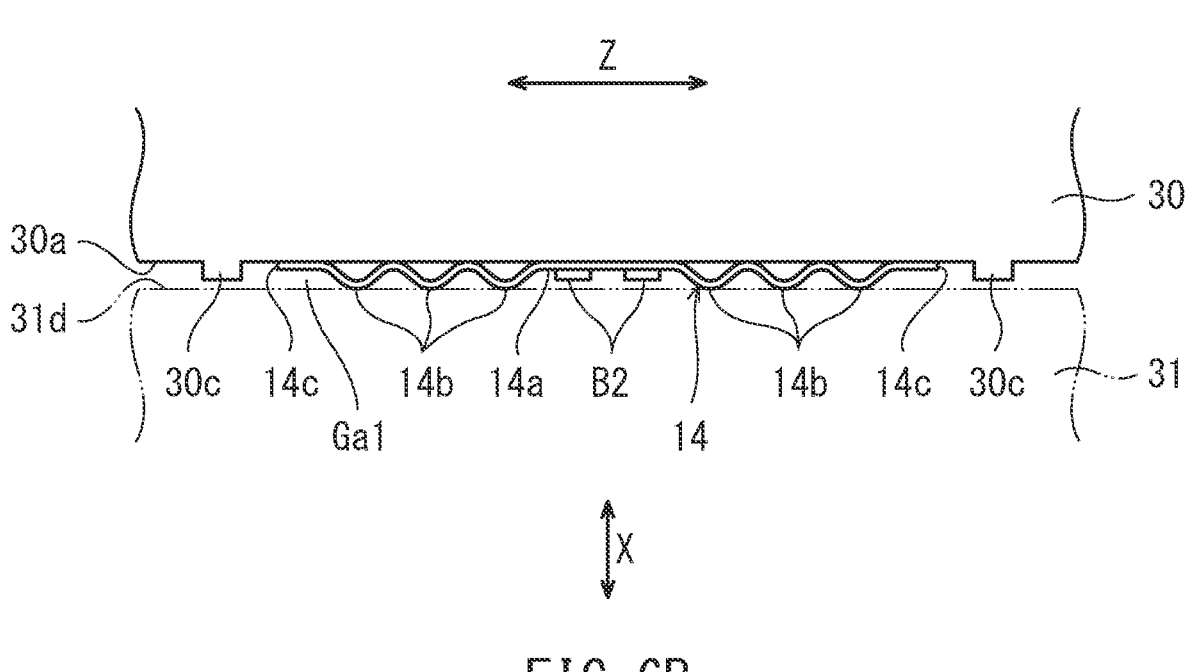
FIG. 6B is a diagram showing the axial elastic body of FIG. 6A and its vicinity which are viewed from the radial direction.

FIG. 6A is an enlarged view showing the first axial elastic body 14 and its vicinity in a sectional view taken along line VIa-VIa of FIG. 2. FIG. 6B is a diagram showing the first axial elastic body 14 of FIG. 6A and its vicinity which are viewed from the radial direction. The first axial elastic body 14 and the second axial elastic body 15 are the same as each other. Therefore, in FIGS. 6A and 6B, the first axial elastic body 14 will be especially described. In consideration of the thermal expansion difference, the machining tolerance, and the like among the first sound absorbing panel 31, the fan track liner panel 30, and the second sound absorbing panel 32, the axial elastic bodies 14 and 15 may be different in material, shape, and the like from each other.

As shown in FIGS. 6A and 6B, the first axial elastic body 14 includes an attaching portion 14*a* and a pair of elastic portions 14*b* that are continuous with the attaching portion 14*a* in the circumferential direction Z. The attaching portion 14*a* is fastened to the fan track liner panel 30 with fasteners B2 in attachment holes 30*b* located on an end surface 30*a* of the fan track liner panel 30 which faces in the axial direction X. The elastic portions 14*b* are elastically deformable in the axial direction X. A projecting amount of the elastic portion 14*b* projecting in the axial direction X from the end surface 30*a* of the fan track liner panel 30 is larger than that of the fastener B2. The attaching portion 14*a* may be fixed to the fan track liner panel 30 with another type of means, such as an adhesive. The first axial elastic body 14 may be attached to the first sound absorbing panel 31 instead of being attached to the fan track liner panel 30.

The first axial elastic body 14 is, for example, a plate spring extending in the circumferential direction Z. The attaching portion 14*a* has a shape (for example, a flat plate shape) extending along the end surface 30*a* of the fan track liner panel 30. When viewed from the radial direction Y, the elastic portions 14*b* includes at least one portion that projects in the axial direction X. In the present embodiment, the elastic portion 14*b* has a corrugated plate shape. However, the shape of the elastic portion 14*b* is not limited to this. Both end portions of the first axial elastic body 14 in the circumferential direction Z are end portions 14*c* that are not fixed.

At the time of the assembling of the fan case assembly 10, when the first sound absorbing panel 31 is inserted into the fan case main body 20 from the front side, an end surface 31*d* of the first sound absorbing panel 31 presses the elastic portions 14*b* of the first axial elastic body 14 in the axial direction X, and the elastic portions 14*b* are compressed in the axial direction X. At this time, the end portions 14*c* of the first axial elastic body 14 slide on the end surface 30*a* of the fan track liner panel 30 in the circumferential direction Z.

The end surface 30*a* of the fan track liner panel 30 includes stoppers 30*c* that are opposed to the corresponding end portions 14*c* of the first axial elastic body 14 in the circumferential direction Z and are located away from the corresponding end portions 14*c* of the first axial elastic body 14. The stoppers 30*c* project forward in the axial direction X from the end surface 30*a* of the fan track liner panel 30. When the elastic portions 14*b* are pressed by the first sound absorbing panel 31, the end portions 14*c* slide in the circumferential direction Z so as to approach the corresponding stoppers 30*c*, and then, the end portions 14*c* contact the corresponding stoppers 30*c*. Thus, the sliding of the end portions 14*c* is restricted. Therefore, the elastic deformation of the elastic portions 14*b* is limited, and the first sound absorbing panel 31 is prevented from contacting the fasteners B2.

The elastic portions 14*b* of the first axial elastic body 14 are pressed in the axial direction X by the first sound absorbing panel 31. Therefore, the fan track liner panel 30 can approach or separate from the first sound absorbing panel 31 in the axial direction X.

According to the above-described configuration, the fan case 11, the fan track liner panel 30, the first sound absorbing panel 31, and the second sound absorbing panel 32 are stably held by the radial elastic bodies 13, the first axial elastic body 14, and the second axial elastic body 15, and the thermal expansion difference and the machining tolerance are absorbed by the elastic deformation of the elastic body between two members. Therefore, problems, such as stress concentration and vibration of the fan case assembly 10, can be prevented from occurring.

Especially, when the linear expansion coefficient of the fan case 11 and the linear expansion coefficient of the panel set 12 are different from each other, the thermal expansion difference is suitably absorbed. Moreover, the degree of freedom of the selection of materials of the fan case 11 and the panel set 12 can be improved.

Moreover, since the stoppers 30*c* and 31*c* that limit the elastic deformation of the elastic bodies 13 to 15 are included, it is possible to prevent a case where the elastic bodies 13 to 15 are excessively and elastically deformed, and therefore, are displaced beyond expectation.

Moreover, since the elastic portion 13*b* of the radial elastic body 13 has the tapered shape that tapers in the radial direction Y, the panel set 12 can be inserted into the fan case 11 in the axial direction X at the time of the assembling of the fan case assembly 10. Thus, assembling efficiency can be improved.

Moreover, since the attaching portion 13*a* of the radial elastic body 13 is attached to the panel set 12 with the fastener B1 in the attachment hole 31*b* of the panel set 12, the fan case 11 does not have to include the attachment hole 31*b* used to attach the radial elastic body 13. Therefore, the strength of the fan case 11 that is required to have containment performance can be prevented from deteriorating.

Moreover, since the radial elastic bodies 13, the first axial elastic body 14, and the second axial elastic body 15 can be located at arbitrary positions, the radial elastic bodies 13, the first axial elastic body 14, and the second axial elastic body 15 can flexibly absorb the thermal expansion difference and the machining tolerance among the panels 30 to 32 while stably supporting the fan track liner panel 30, the first sound absorbing panel 31, and the second sound absorbing panel 32.

Figure 7:
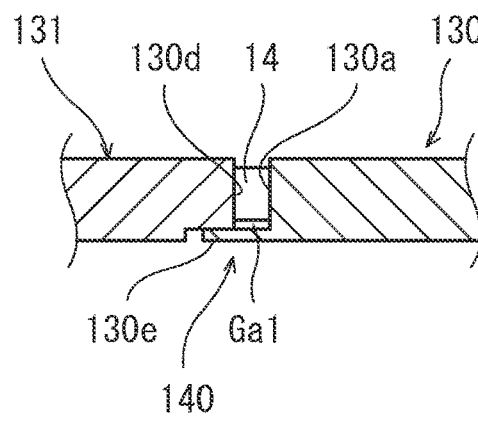
FIG. 7 is a sectional view showing a modified example of a peripheral structure of the axial elastic body of FIG. 2.
Figure 7:
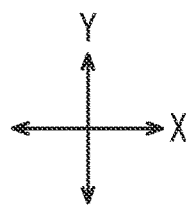

FIG. 7 is a sectional view showing a modified example of a peripheral structure of the axial elastic body 14 of FIG. 2. As shown in FIG. 7, in the present modified example, two members (for example, a fan track liner panel 130 and a first sound absorbing panel 131) sandwiching the first axial elastic body 14 in the axial direction X include a positioning structure 140 that positions the two members in the radial direction Y.

The positioning structure 140 includes, for example, a circumferential projection 130*e* that projects in the axial direction X from an inner peripheral edge of an end surface 130*a* of the fan track liner panel 130. The circumferential projection 130*e* is in contact with an inner peripheral surface of the first sound absorbing panel 131. The circumferential projection 130*e* may project from the first sound absorbing panel 131.

Therefore, the fan track liner panel 130 and the first sound absorbing panel 131 can be positioned relative to each other in the radial direction Y. Moreover, the circumferential projection 130e can cover the first axial elastic body 14 from an inside in the radial direction Y. Since the other components are the same as those in the above embodiment, explanations thereof are omitted.

Figure 8:
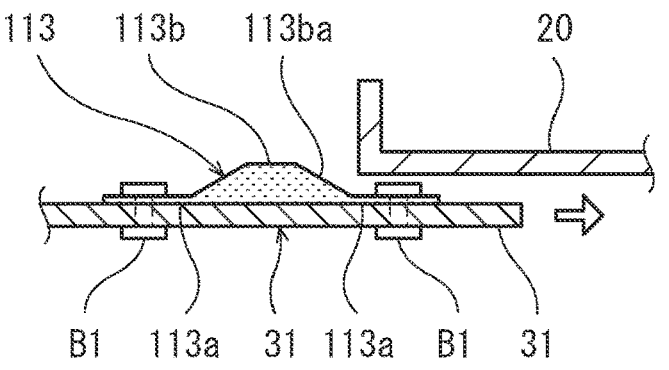
FIG. 8 is a diagram showing First Modified Example of the radial elastic body and corresponding to FIG. 5.
Figure 8:
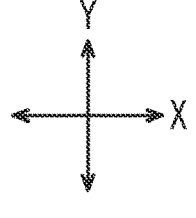

FIG. 8 is a diagram showing a radial elastic body 113 of First Modified Example and corresponding to FIG. 5. As shown in FIG. 8, the radial elastic body 113 of First Modified Example is made of an elastic material (for example, rubber). The radial elastic body 113 includes a pair of attaching portions 113a and an elastic portion 113b located between the pair of attaching portions 113a in the axial direction X. The attaching portions 113a are fastened to the first sound absorbing panel 31 with the fasteners B1 in the attachment holes 31b of the first sound absorbing panel 31. In the X-Y section, the elastic portion 113b includes a portion that projects outward in the radial direction Y. A projecting amount of the elastic portion 113b projecting outward in the radial direction Y from the first sound absorbing panel 31 is larger than that of the fastener B1.

The elastic portion 113b has a tapered shape that tapers toward the fan case main body 20. The elastic portion 113b includes a slope surface 113ba that is continuous with the attaching portion 113a. The slope surface 113ba is an inclined surface that gradually approaches the outer peripheral surface 31a of the first sound absorbing panel 31 as it approaches the attaching portion 113a.

At the time of the assembling, when the first sound absorbing panel 31 is inserted from the front side into the fan case main body 20 from which the front closing plate 21 has been detached, the slope surface 113ba is pressed by the fan case main body 20, and the elastic portion 113b is compressed inward in the radial direction Y. Finally, a surface of the elastic portion 113b which is located at an outside in the radial direction Y is compressed inward in the radial direction Y by the inner peripheral surface of the fan case main body 20. Since both end portions (attaching portions 113a) of the radial elastic body 113 in the axial direction X are fixed to the first sound absorbing panel 31 with the fasteners B1, the radial elastic body 113 is prevented from being worn away by the outer peripheral surface of the first sound absorbing panel 31. Since the other components are the same as those in the above embodiment, explanations thereof are omitted.

Figure 9:
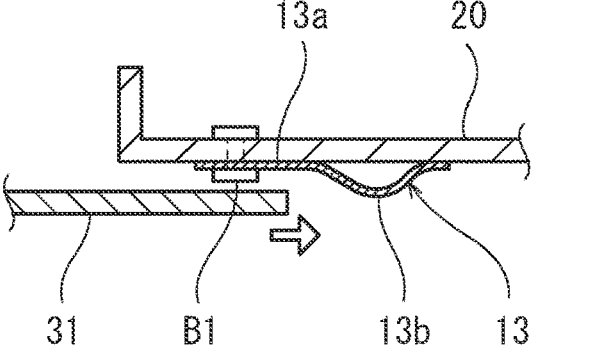
FIG. 9 is a diagram showing Second Modified Example of the radial elastic body and corresponding to FIG. 5.
Figure 9:
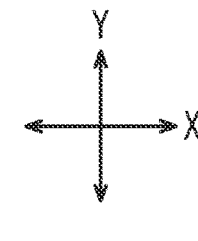

FIG. 9 is a diagram showing Second Modified Example of the radial elastic body 13 and corresponding to FIG. 5. As shown in FIG. 9, in Second Modified Example, the radial elastic body 13 is attached to the fan case main body 20 instead of being attached to the first sound absorbing panel 31. In this case, the radial elastic body 13 may be located such that the slope surface 13ba is directed to a side at which the first sound absorbing panel 31 is inserted (i.e., to the front side). The attaching portion 13a may be located at the side at which the first sound absorbing panel 31 is inserted, with respect to the elastic portion 13b (i.e., at the front side of the elastic portion 13b). Since the other components are the same as those in the above embodiment, explanations thereof are omitted.

Figure 10A:
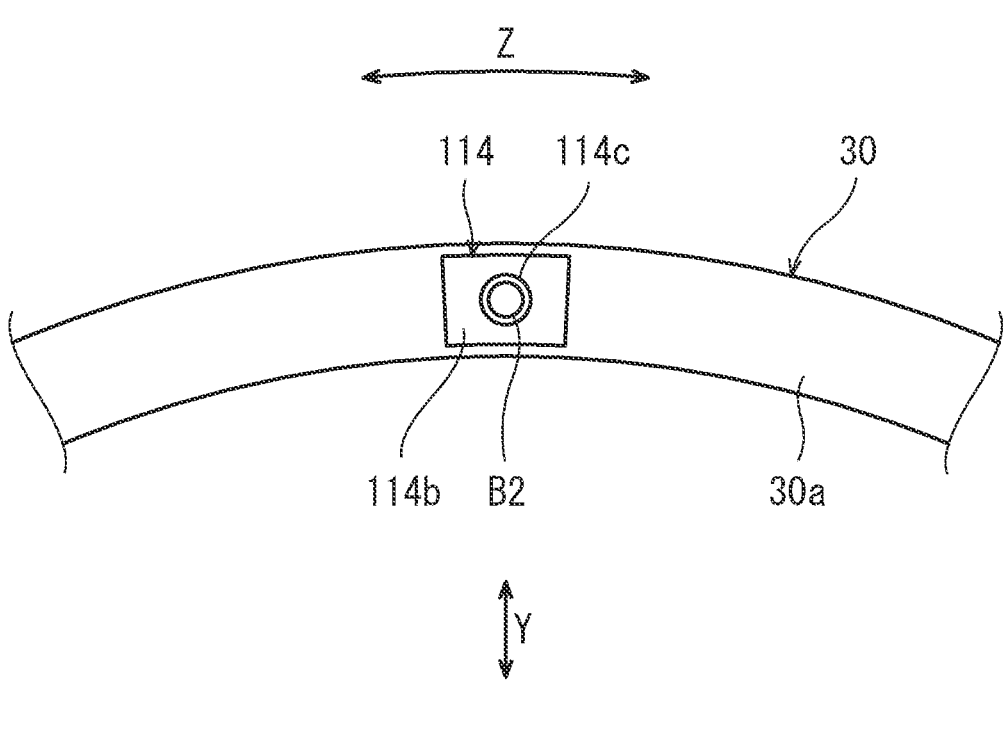
FIG. 10A is a diagram showing First Modified Example of the axial elastic body and corresponding to FIG. 6A.
Figure 10B:
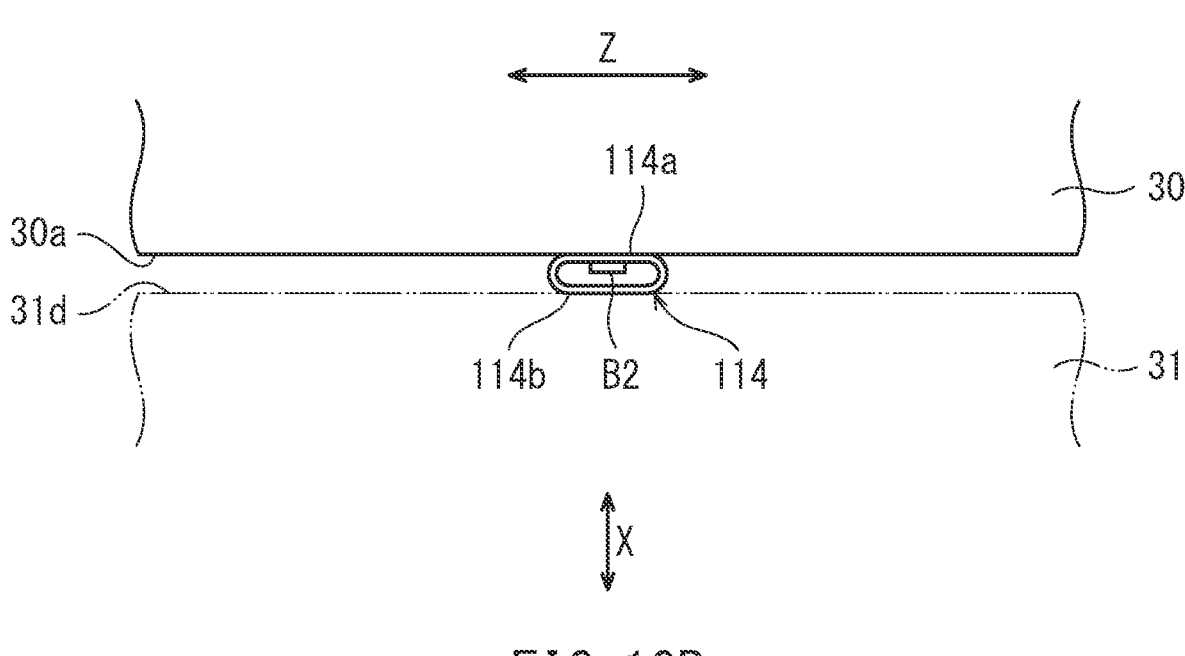
FIG. 10B is a diagram showing First Modified Example of the axial elastic body and corresponding to FIG. 6B.

FIG. 10A is a diagram showing an axial elastic body 114 of First Modified Example and corresponding to FIG. 6A. FIG. 10B is a diagram showing the axial elastic body 114 of First Modified Example and corresponding to FIG. 6B. As shown in FIGS. 10A and 10B, the axial elastic body 114 is an annular plate spring. The axial elastic body 114 includes:

an attaching portion 114a that is part of the annular shape; and an elastic portion 114b that is the rest of the annular shape. The attaching portion 114a is fastened to the fan track liner panel 30 with the fastener B2. The elastic portion 114b includes an opening 114c that exposes the fastener B2 when viewed from the axial direction X. The attaching portion 114a may be fastened to the first sound absorbing panel 31 with the fastener B2. The fastener B2 may be covered with the elastic portion 114b.

The first axial elastic body 114 is pressed by the first sound absorbing panel 31 in the axial direction X with the elastic portion 114b located between the fastener B2 and the first sound absorbing panel 31. When the elastic portion 114b is pressed by the end surface 31d of the first sound absorbing panel 31 in the axial direction X, the axial elastic body 114 is elastically deformed such that a contact area of the axial elastic body 114 with respect to the fan track liner panel 30 increases. Therefore, the axial elastic body 114 is prevented from being worn away by the fan track liner panel 30 and the first sound absorbing panel 31. Since the other components are the same as those in the above embodiment, explanations thereof are omitted.

Figures 11A, 11B:
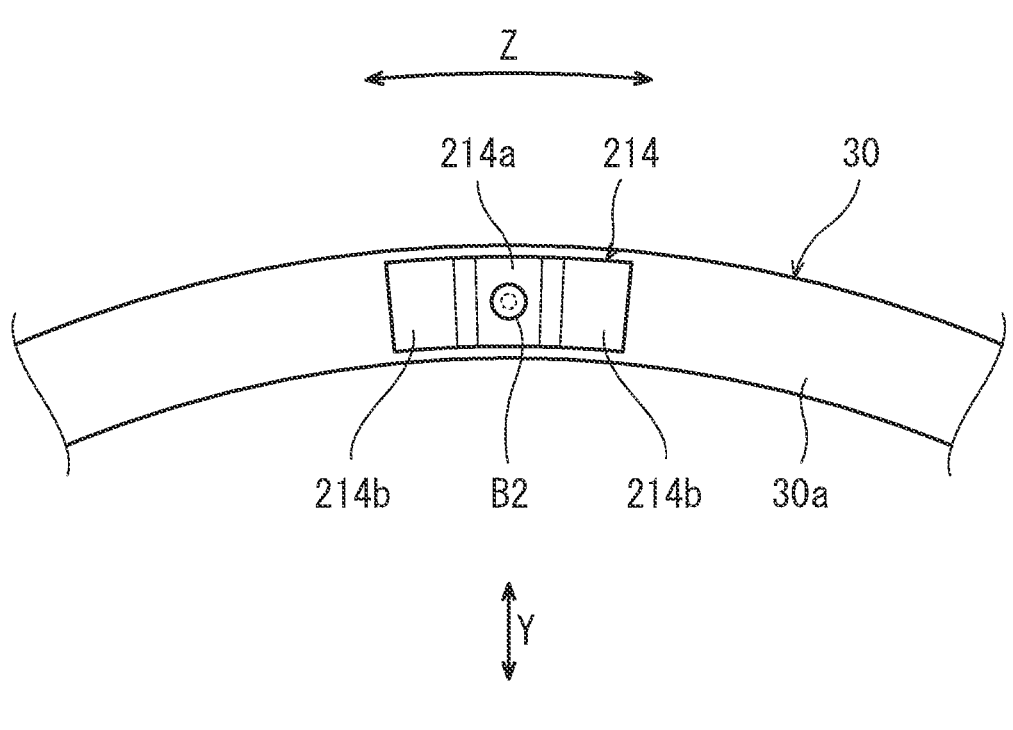
FIG. 11A is a diagram showing Second Modified Example of the axial elastic body and corresponding to FIG. 6A.
FIG. 11B is a diagram showing Second Modified Example of the axial elastic body and corresponding to FIG. 6B.

FIG. 11A is a diagram showing an axial elastic body 214 of Second Modified Example and corresponding to FIG. 6A. FIG. 11B is a diagram showing the axial elastic body 214 of Second Modified Example and corresponding to FIG. 6B. As shown in FIGS. 11A and 11B, the axial elastic body 214 is a plate spring that has been subjected to bending. The axial elastic body 214 includes an attaching portion 214a and a pair of elastic portions 214b that are continuously located at both sides of the attaching portion 214a in the circumferential direction Z.

The attaching portion 214a has, for example, a flat plate shape and is fastened to the fan track liner panel 30 with the fastener B2. Moreover, the attaching portion 214a may be fastened to the first sound absorbing panel 31 with the fastener B2. For example, part of each elastic portion 214b may be curved in a C shape or a U shape in a section viewed from the radial direction Y. The elastic portions 214b project in the axial direction X beyond the fastener B2. The elastic portions 214b are compressed by the end surface 31d of the first sound absorbing panel 31 in the axial direction X. Since the other components are the same as those in the above embodiment, explanations thereof are omitted.

Figure 12A:
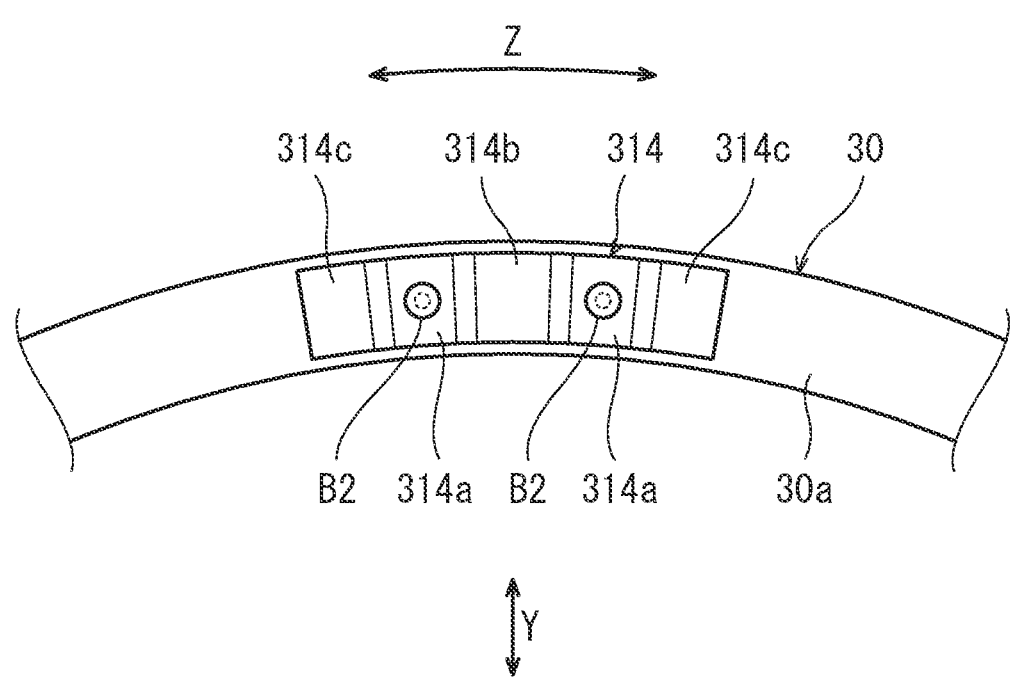
FIG. 12A is a diagram showing Third Modified Example of the axial elastic body and corresponding to FIG. 6A.
Figure 12B:
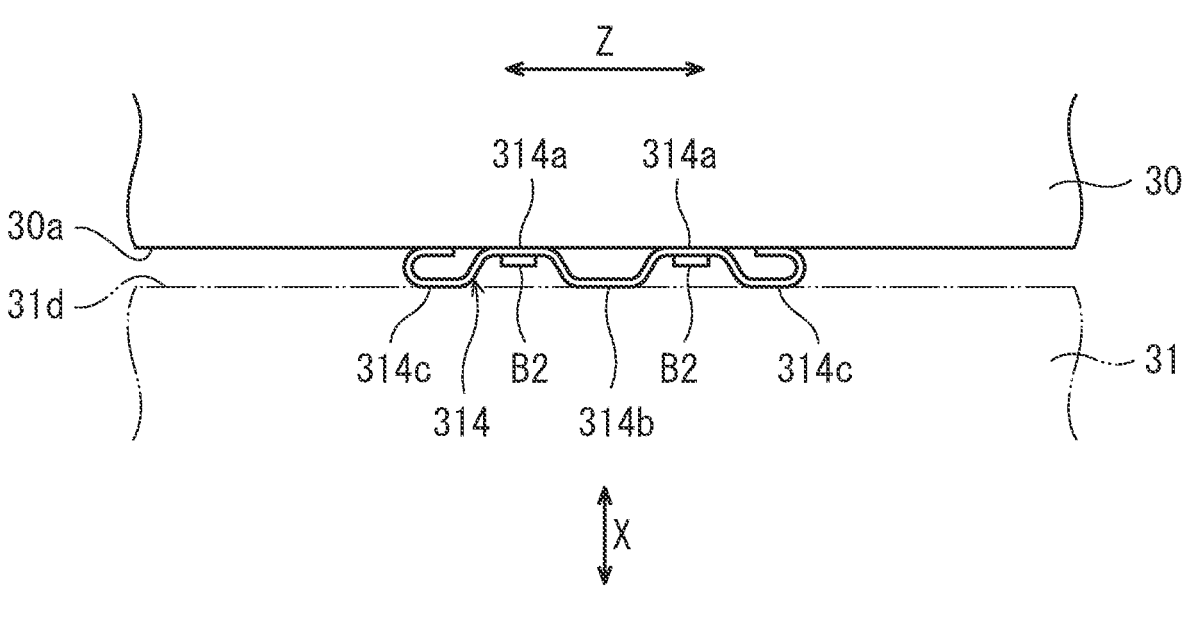
FIG. 12B is a diagram showing Third Modified Example of the axial elastic body and corresponding to FIG. 6B.

FIG. 12A is a diagram showing an axial elastic body 314 of Third Modified Example and corresponding to FIG. 6A. FIG. 12B is a diagram showing the axial elastic body 314 of Third Modified Example and corresponding to FIG. 6B. As shown in FIGS. 12A and 12B, the axial elastic body 314 is a plate spring that has been subjected to bending. The axial elastic body 314 includes: a pair of attaching portions 314a; a middle elastic portion 314b located between the pair of attaching portions 314a; and side elastic portions 314c located outside the corresponding attaching portions 314a in the circumferential direction Z.

Each attaching portion 314a has, for example, a flat plate shape and is fastened to the fan track liner panel 30 with the fastener B2. Moreover, the attaching portion 314a may be fastened to the first sound absorbing panel 31 with the fastener B2. The middle elastic portion 314b is curved so as to project toward the first sound absorbing panel 31. For example, part of each side elastic portion 314c may be curved in a C shape or a U shape in a section viewed from the radial direction Y. The middle elastic portion 314b and the side elastic portions 314c project in the axial direction X beyond the fasteners B2. The middle elastic portion 314b and the side elastic portions 314c are compressed in the axial direction X by the end surface 31*d* of the first sound absorbing panel 31. Since the other components are the same as those in the above embodiment, explanations thereof are omitted.

Figure 13A:
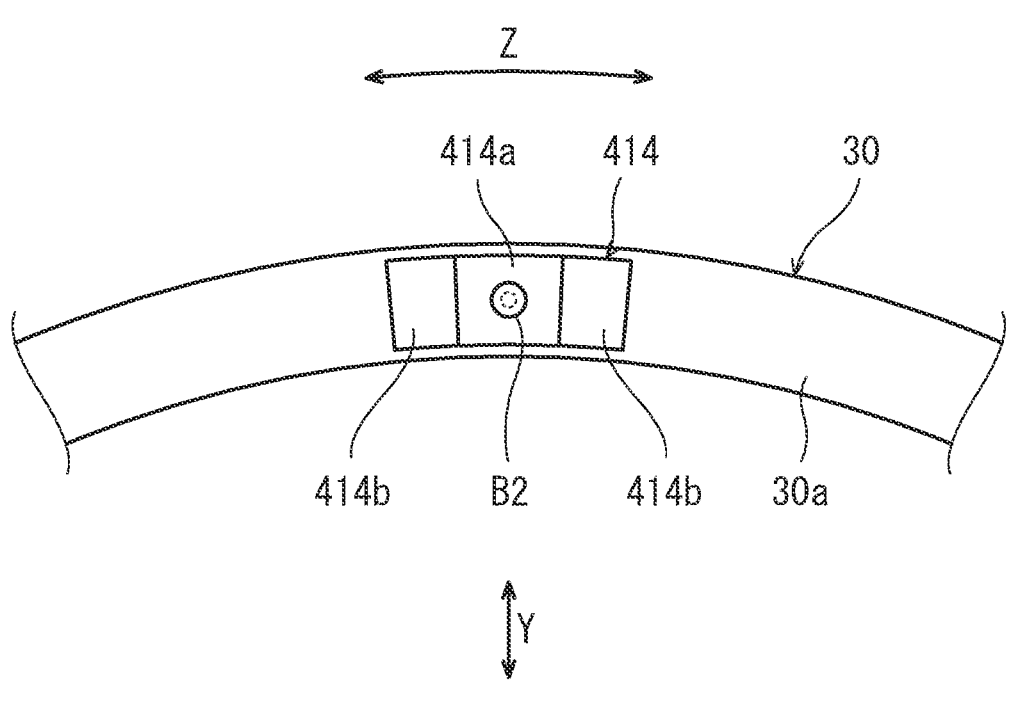
FIG. 13A is a diagram showing Fourth Modified Example of the axial elastic body and corresponding to FIG. 6A.
Figure 13B:
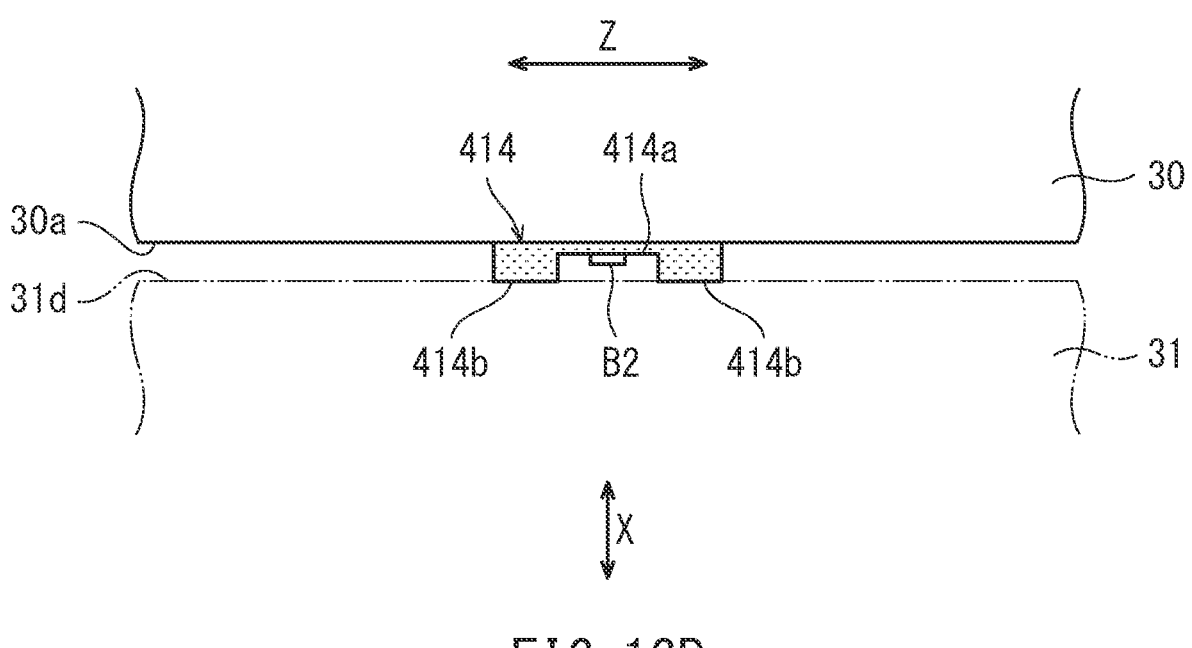
FIG. 13B is a diagram showing Fourth Modified Example of the axial elastic body and corresponding to FIG. 6B.

FIG. 13A is a diagram showing an axial elastic body 414 of Fourth Modified Example and corresponding to FIG. 6A. FIG. 13B is a diagram showing the axial elastic body 414 of Fourth Modified Example and corresponding to FIG. 6B. As shown in FIGS. 13A and 13B, the axial elastic body 414 is made of an elastic material (for example, rubber). The axial elastic body 414 includes an attaching portion 414*a* and a pair of elastic portions 414*b* that are continuously located at both sides of the attaching portion 414*a* in the circumferential direction Z. The attaching portion 414*a* is fastened to the fan track liner panel 30 with the fastener B2. Moreover, the attaching portion 414*a* may be fastened to the first sound absorbing panel 31 with the fastener B2. The elastic portions 414*b* project in the axial direction X beyond the fastener B2. The elastic portions 414*b* are compressed in the axial direction X by the end surface 31*d* of the first sound absorbing panel 31. Since the other components are the same as those in the above embodiment, explanations thereof are omitted.

The present disclosure is not limited to the above embodiment. Modifications, additions, and eliminations may be made with respect to the configuration of the embodiment. For example, some of components or methods in one embodiment may be applied to another embodiment. Some components in an embodiment may be separated and arbitrarily extracted from the other components in the embodiment. The radial elastic body 13 or the axial elastic bodies 14 and 15 may be omitted, and the radial gap Gr or the axial gaps Ga1 and Ga2 may be omitted. The first axial elastic body 14 or the second axial elastic body 15 may be omitted, and the first axial gap Ga1 or the second axial gap Ga2 may be omitted. The axial elastic body may be sandwiched between the front closing plate 21 and the first sound absorbing panel 31 and/or between the rear closing plate 22 and the second sound absorbing panel 32.

REFERENCE SIGNS LIST

1 turbo fan engine
3 fan
10 fan case assembly
11 fan case
12 panel set
13, 113 radial elastic body
13*a*, 113*a* attaching portion
13*b*, 113*b* elastic portion
14, 114, 214, 314, 414 first axial elastic body
14*a*, 114*a*, 214*a*, 314*a*, 414*a* attaching portion
14*b*, 114*b*, 214*b*, 314*b*, 314*c*, 414*b* elastic portion
15 second axial elastic body
20 fan case main body
21 front closing plate
22 rear closing plate
30, 130 fan track liner panel
30*c* stopper
31, 131 first sound absorbing panel
31*c* stopper
32 second sound absorbing panel
Gr radial gap
Ga1 first axial gap
Ga2 second axial gap
B1, B2 fastener
L rotation axis

12

X axial direction
Y radial direction
Z circumferential direction

The invention claimed is:
1. A fan case assembly of a turbo fan engine, the fan case assembly comprising:
a tubular fan case surrounding a fan of the turbo fan engine from an outside in a radial direction;
a tubular panel set covering an inner peripheral surface of the tubular fan case such that a radial gap is formed overall between the tubular fan case and the tubular panel set, the tubular panel set including panels lined up in an axial direction of the turbo fan engine; and
at least one elastic body compressed by two members selected from the tubular fan case and the panels, wherein:
a linear expansion coefficient of the tubular fan case and a linear expansion coefficient of the tubular panel set are different from each other;
the at least one elastic body includes a radial elastic body compressed by the tubular fan case and the tubular panel set in the radial direction; and
the radial elastic body is a plate spring extending in the axial direction,
the radial elastic body includes
an attaching portion attached to one of the tubular panel set and the tubular fan case,
an elastic portion that projects in the radial direction and compressed by the other of the tubular panel set and the tubular fan case in the radial direction, and
an end portion that is on the opposite side in the axial direction to the attaching portion and is slidable in the axial direction,
wherein one of the two members includes a stopper that limits elastic deformation of the radial elastic body;
the stopper is located such that when the elastic portion is pressed radially, the end portion slides in the axial direction so as to approach the stopper and then the end portion contacts the stopper.
2. The fan case assembly according to claim 1, wherein:
the tubular panel set includes an attachment hole; and
the attaching portion of the radial elastic body is attached to the tubular panel set with a fastener in the attachment hole of the tubular panel set.
3. The fan case assembly according to claim 1, wherein the at least one elastic body includes at least one axial elastic body compressed by the panels in the axial direction.
4. The fan case assembly according to claim 3, wherein:
the panels include
a first sound absorbing panel,
a second sound absorbing panel, and
a fan track liner panel located between the first sound absorbing panel and the second sound absorbing panel in the axial direction and opposed to the fan in the radial direction; and
the at least one axial elastic body includes
a first axial elastic body compressed by the fan track liner panel and the first sound absorbing panel in the axial direction and
a second axial elastic body compressed by the fan track liner panel and the second sound absorbing panel in the axial direction.
5. The fan case assembly according to claim 1, wherein:
the tubular fan case includes
a fan case main body located outside the tubular panel set in the radial direction and a front closing plate and a rear closing plate which are respectively located at a front end and a rear end of the tubular panel set in the axial direction and are fixed to the fan case main body; and the at least one elastic body includes at least one axial elastic body compressed in the axial direction by two adjacent elements selected from the front closing plate, the panels, and the rear closing plate.

6. The fan case assembly according to claim 5, wherein:

the panels include a first panel opposed to the front closing plate in the axial direction and a second panel opposed to the rear closing plate in the axial direction; and the at least one axial elastic body includes an axial elastic body compressed in the axial direction by the front closing plate and the first panel or compressed in the axial direction by the rear closing plate and the second panel.

* * * * *